Aug. 30, 1927.

J. D. BENBOW 1,640,637

DUMP CAR

Filed Feb. 7, 1924

Witness
Milton Lenoir

Inventor
James D. Benbow
By Vines Jackson
Attorneys

Aug. 30, 1927.
J. D. BENBOW
DUMP CAR
Filed Feb. 7, 1924
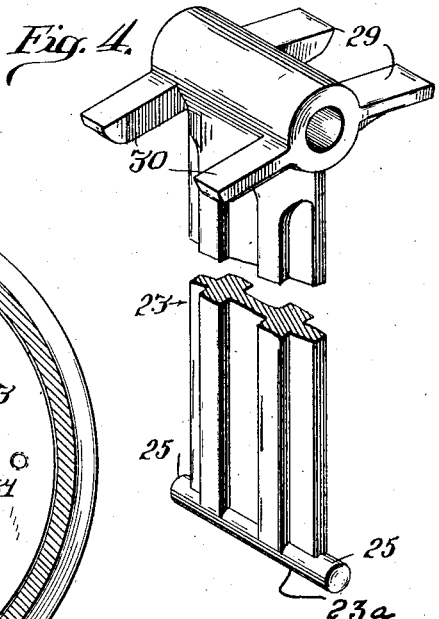
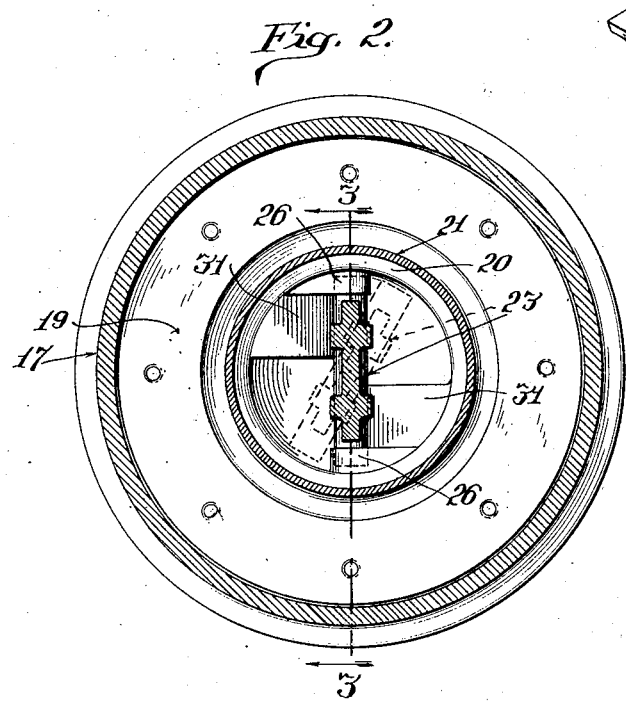
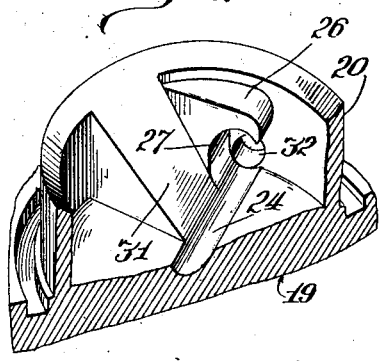
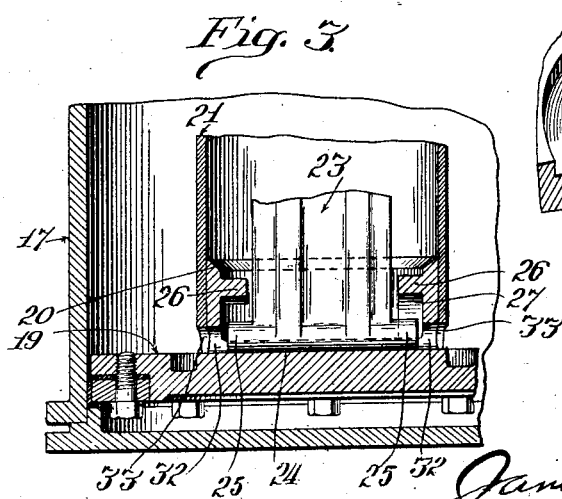

Patented Aug. 30, 1927.

1,640,637

UNITED STATES PATENT OFFICE.

JAMES D. BENBOW, OF AURORA, ILLINOIS, ASSIGNOR TO WESTERN WHEELED SCRAPER COMPANY, OF AURORA, ILLINOIS, A CORPORATION OF ILLINOIS.

DUMP CAR.

Application filed February 7, 1924. Serial No. 691,188.

This invention relates to improvements in dump-cars of the general type shown and described in Letters Patent No. 1,357,251, dated November 2, 1920, in which the car-body is adapted to be tilted laterally in either direction to discharge its load—such tilting of the car-body and its return to normal load-carrying position being accomplished by means of compressed air-operated pistons at opposite sides of the car. In connection with each such piston there is employed a rocking bar which rests upon the piston and swings transversely of the car and is adapted by operative engagement with the car-body, through the medium of certain lever mechanism that is interposed between the side margins of the car-body and the under body mounted on the trucks to cause the desired tilting of the car-body. While such rocking bar and the member of the said lever mechanism that it contacts with are intended to be so constructed that there will be no such connection between those parts as will prevent the free downward movement of the bar with the piston when such piston commences to descend, it does sometimes happen that, owing to slight disarrangement of some part of the lever mechanism, or for some other reason, the bar will get so wedged to or interlocked with the part of the lever mechanism that it engages that it fails to descend with the piston, and by reason of its lower end being unconnected with the piston head such bar, by being banged against the wall of the comparatively long and narrow hollow piston stem in which it is located, causes at such times considerable damage. The lower end of the bar is intended to be seated at all times on the piston and be free to rock thereon, and it is the object of the invention to provide means whereby such seating will be compelled and the bar forced to travel downward with the piston, thereby freeing it from the member of the lever mechanism that it comes in contact with if at any time it tends to become wedged to or temporarily connected with such member; also, it is an object of the invention to so construct the bar and the piston that the bar can be readily inserted in the said hollow stem of the piston and, notwithstanding the height and narrowness of such stem, be easily positioned to be in operative relation to the means carried by the piston that compel the proper seating of the rod on the piston as stated. These objects I attain by the construction and arrangement of parts shown in the drawings and hereinafter fully described. That which is believed to be new will be set forth in the claims.

In the drawings:—

Fig. 1 is a view showing the car-body in transverse vertical section, and showing in elevation the lever mechanism that is interposed between such car-body and the under body, and showing also in broken lines the dumping position of the car-body and, at one side, the position of the various parts when the car is in such dumping or discharging position,—the cylinder and piston at one side of the car being in section;

Fig. 2 is an enlarged horizontal section taken at line 2—2 of Fig. 1;

Fig. 3 is a vertical section taken at line 3—3 of Fig. 2;

Fig. 4 is a perspective view of the rocking bar that is mounted on the piston, a portion of such bar being broken away; and Fig. 5 is a perspective view of a portion of one of the pistons.

Figure 1:
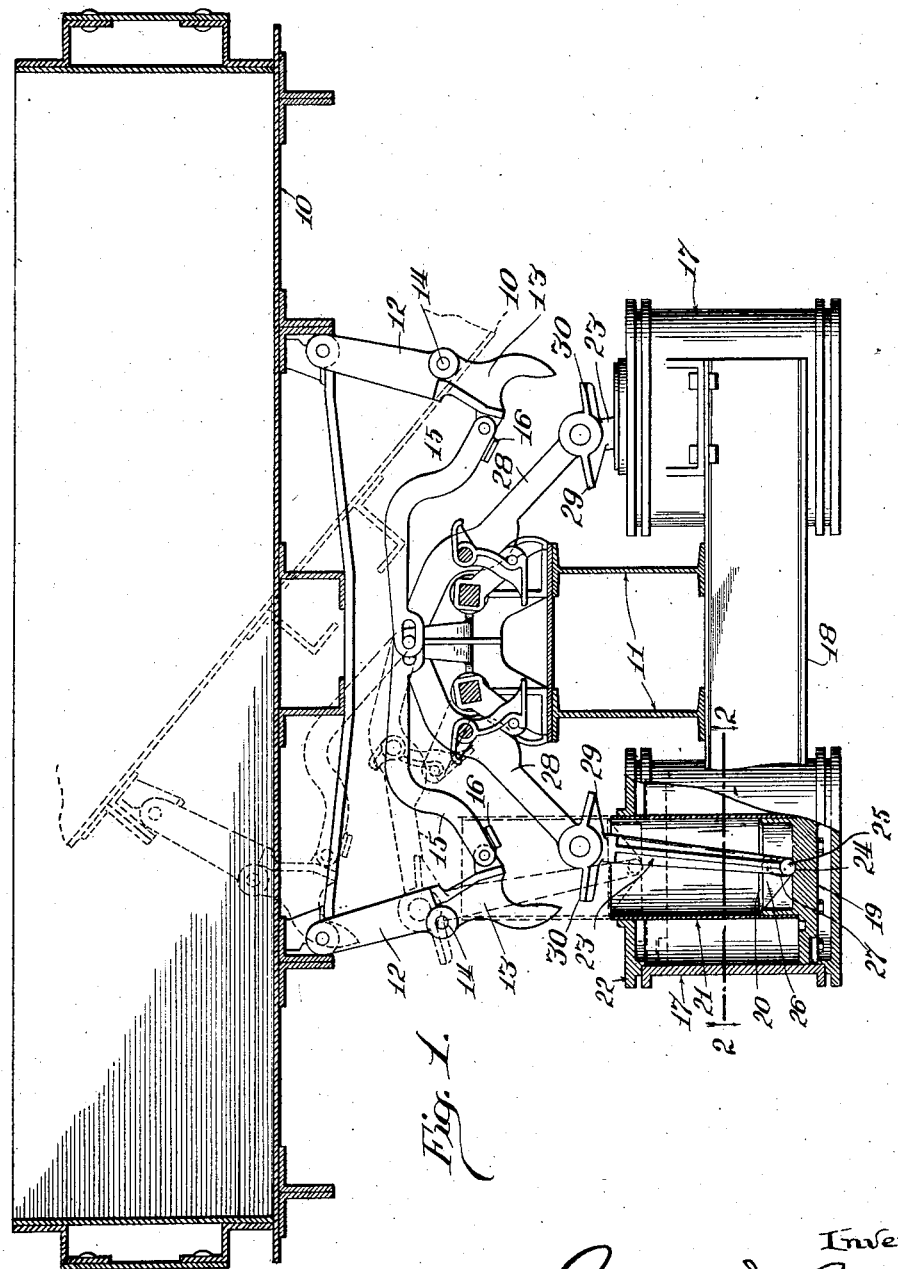

Referring to the drawings,—10 indicates a car-body, which is to be pivotally mounted on the under-frame shown at 11, and interposed between such car-body and under-frame is a lever mechanism through which the tilting of the car-body to either side may be accomplished. Inasmuch as such lever mechanism is old, and is very fully shown and described in patent to Jay B. Rhodes; No. 1,357,251, I do not deem it necessary to here enter into a detailed description of the construction and operation of the same. Such lever mechanism is duplicated at each side of the car, and comprises at each side a toggle lever or thrust bar whose two parts are indicated by 12 and 13 and the joint thereof by 14, the lower member of such toggle lever having pivotally connected with it a link 15 that at its other end is connected with the under-frame and serves to hold the toggle lever normally in position to be engaged by the upper end of a thrust bar carried by the piston. The lower member of the toggle lever is provided with a socket to receive such upper end of the piston, and on the link 15 is provided a block or plate 16 against which a finger on the said piston is adapted to bear—all as fully explained in said Rhodes patent.

Beneath the car-body and suitably secured to the underframe, as by cross-beams 18, are two cylinders 17, each of which is adapted to be supplied with compressed air in the usual way, either for dumping or righting purposes. Inasmuch as the two cylinders and the parts contained therein are exactly alike, a description of one will suffice. 19 indicates a piston of the plunger type that movably fits within the cylinder and, in the construction shown, an annular wall 20 rises for a short distance from the central portion of the upper face of the piston, and to that wall is secured a cylindrical member 21 that constitutes a hollow stem for the piston, such stem, in the construction shown, rising through and slightly above the upper head 22 of the cylinder. 23 indicates a plunger bar, which is provided at its lower end with an integral cylindrical portion 23$^a$ that serves as a rocker bearing surface for said bar. Such cylindrical portion is normally seated in a correspondingly shaped groove 24 that extends centrally across the upper face of the piston 19. As clearly shown in Fig. 4, the cylindrical portion 23$^a$ of the bar 23 extends outwardly beyond the opposite edges of said bar, forming two projections 25 which also fit in the groove 24. 26 indicates two similarly disposed heavy ears that project from the face and annular wall 20 of the piston, at diametrically opposite points and are preferably formed integral therewith. These ears are spaced apart a sufficient distance to receive between them the body of the bar 23, and the outer edge of each ear is notched as at 27 (see Fig. 5) so as to form hooks that project in opposite directions over the groove 24 in the face of the piston 19 and high enough above such face to permit of the application of the bar 23 thereto, as hereinafter described. As best shown in Fig. 2, these ears are respectively located at opposite sides of the groove 24, and hence to insert the bar 23 in place so that its curved lower edge will be seated in the groove such bar must, when it is inserted into the hollow stem 21, be at an angle to the groove so that the projections 25 can pass the overlying ends of the ears. When inserted in that manner, and the lower edge of the bar is brought to rest upon the surface of the piston, the bar can then be turned axially, which will bring the projections 25 under the overhanging parts or hooks of the ears, and of course allow the rounded lower end of the bar to settle into the groove in the piston. Thereafter, as will be understood, with the bar secured at its upper end in a manner to prevent any axial turning, any relative vertical movement between the piston and the bar that would tend to draw the piston out of its groove would cause the projections 25 to engage with the hook portions of the ears. Said hooks therefore serve to hold the bar in operative relation to the piston without interfering with its rocking. Accidental disconnection of the parts is prevented because the bar is held against axial movement by reason of its being pivoted to the lower end of a swinging arm 28, the inner end of which is pivoted along the center line of the car, as described in said Rhodes patent. With the bar 23 are formed fingers 30 that project laterally from the upper end thereof and are adapted to engage the notched lower edge of the toggle member 13, and also formed with it are other fingers 29 that project in the opposite direction from the fingers 30 and are adapted to engage with the block or plate 16 on the link 15—all as described in said patent.

At 31 are shown heavy diagonal blocks formed with the piston 19 and its wall portion 20, such blocks being located, as are the ears 26, at opposite sides of the groove 24, and lying, in the construction shown, alongside of said ears. Such inclined blocks serve not only as reinforcing and strengthening members, but also as guiding devices for the bar 23 in its limited vertical movement relatively to the piston permitted by the ears 26, and as stops to aline said bar with the groove 24 when applying it to the piston. At 32 are shown holes extending through the wall portion 20 of the piston, which holes register with other holes 33 in the lower end of the hollow stem 21, such holes being provided merely to allow of the escape of any water that may get into the said stem.

When compressed air is admitted to the cylinder for the purpose of forcing upward the piston and the bar that is rockingly mounted thereon, such bar will of course be directed into proper engagement with the lower member 13 of the toggle, and thereby cause either a tilting of the car-body or a righting thereof if such body has theretofore been tilted so as to dump at that side at which is located the moving piston, as fully explained in said Rhodes patent. While ordinarily there will be no such engagement of the piston with the lever mechanism as would prevent the prompt moving down of the rocking bar 23 with its piston, yet under certain circumstances it sometimes happens that there is such a locking of the parts together as to hold the bar 23 up while its piston descends, and in such case such a violent sidewise movement of the lower end of the bar ensues as is apt to be destructive of the piston parts. However, by the provision of the hook-shaped ears that overlie the projections 25 on the bar, it is evident that if any such entangling of the bar with the lever mechanism takes place, the hooks of the ears will be brought into contact with the said projections soon after the piston starts downward, and will exert a powerful pull on the bar that will release it from any such undesired engagement with the lever mechanism, and maintain the bar in operative relation to the piston.

The construction described for normally holding the plunger bar and the piston in operative connection with each other while permitting them to be disconnected, considered apart from the application thereof to a dump-car, is not herein separately claimed as it forms the subject matter of a divisional application filed January 28, 1926, Serial No. 84,295.

What I claim as my invention and desire to secure by Letters Patent, is—

1. In a dump car, the combination of a tilting car body, a cylinder, a piston movable in said cylinder to tilt the car body, a plunger bar having a rocking bearing surface at its lower end seated on the piston, means connected with the upper end of said bar for rocking it on the piston into position to operatively engage the car body when the said piston moves upwardly, and means for normally maintaining said bar and piston in operative connection with each other.

2. In a dump-car, the combination of a car-body, a cylinder beneath said body, a piston movable in said cylinder, a bar normally resting on the piston and movable thereon, means connected with the upper end of said bar for rocking it on the piston into position to operatively engage the car-body when said bar is moved upwardly, and a hook-shaped member on the upper face of the piston adapted to engage the lower end portion of said bar to compel said bar to move down with the piston.

3. In a dump-car, the combination of a car-body, a cylinder beneath said body, a piston movable in said cylinder, a bar normally resting on the piston and movable thereon, means connected with the upper end of said bar for rocking it on the piston into position to operatively engage the car-body when said bar is moved upwardly, projections extending from opposite sides of said bar, and two hook-shaped spaced-apart members on the upper face of the piston adapted to be engaged by said projections respectively to compel said bar to move down with the piston.

4. In a dump-car, the combination of a car-body, a cylinder beneath said body, a piston movable in said cylinder, a bar normally resting on the piston and movable thereon, means connected with the upper end of said bar for rocking it on the piston into position to operatively engage the car-body when said bar is moved upwardly, projections extending from opposite sides of said bar, and two hook-shaped spaced-apart members on the upper face of the piston adapted to be engaged by said projections respectively to compel said bar to move down with the piston, said hook-shaped members extending in opposite directions.

5. In a dump car, the combination of a tilting car body, a cylinder, a piston movable in said cylinder to tilt the car body, a plunger bar having a rocker bearing at its lower end seated on the piston, said bearing having outwardly extending projections, means connected with the upper end of said bar for rocking it on the piston into position to operatively engage the car body when the piston moves upwardly, and means carried by the piston for engaging said projections to normally hold said bar and piston in operative connection with each other.

JAMES D. BENBOW.